E. E. MOSELEY.
PORTABLE AUTOMOBILE GROCERY STORE.
APPLICATION FILED JULY 19, 1919.
1,333,670.
Patented Mar. 16, 1920.
3 SHEETS—SHEET 1.
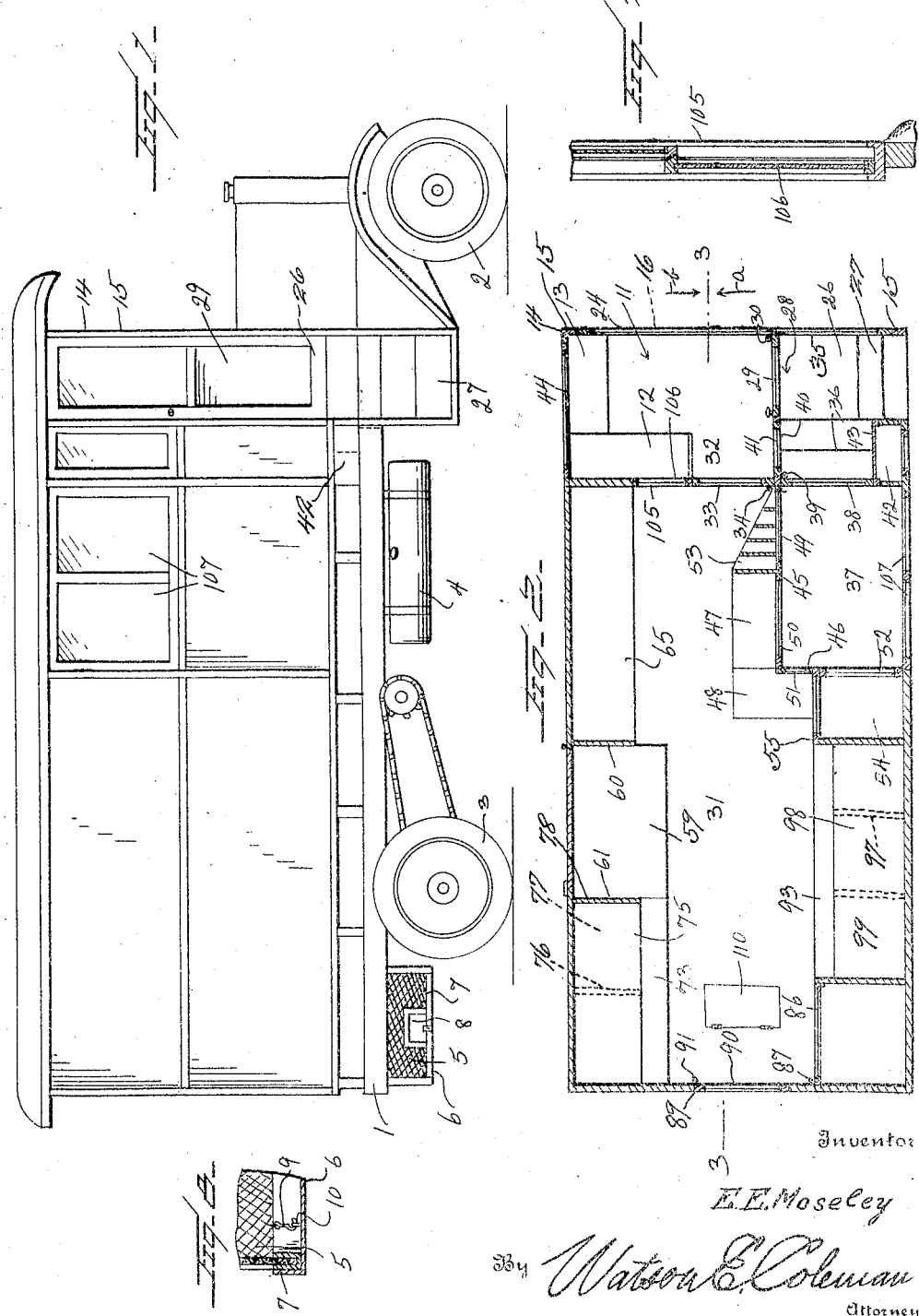
Inventor
E. E. Moseley
By Watson E. Coleman
Attorney

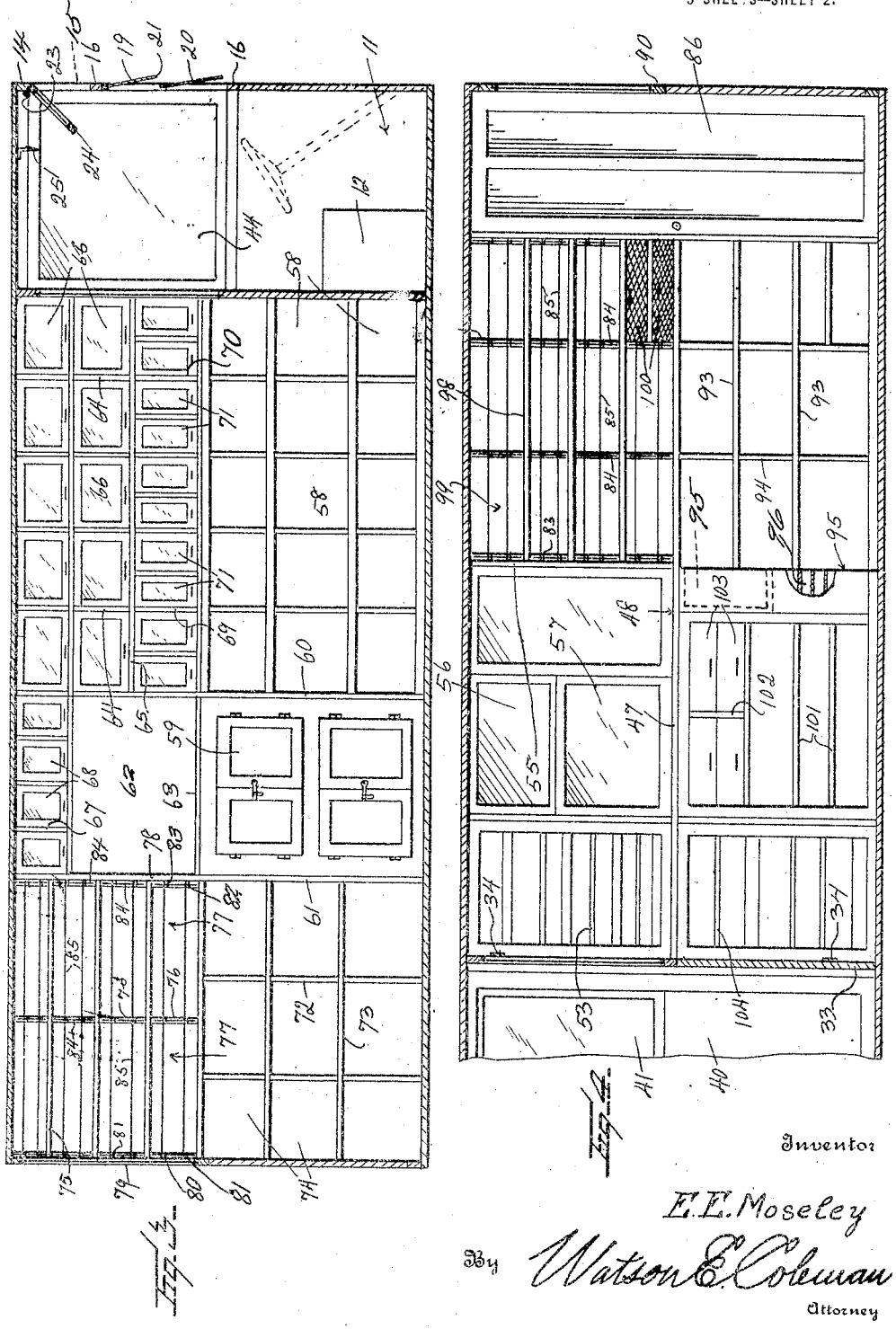

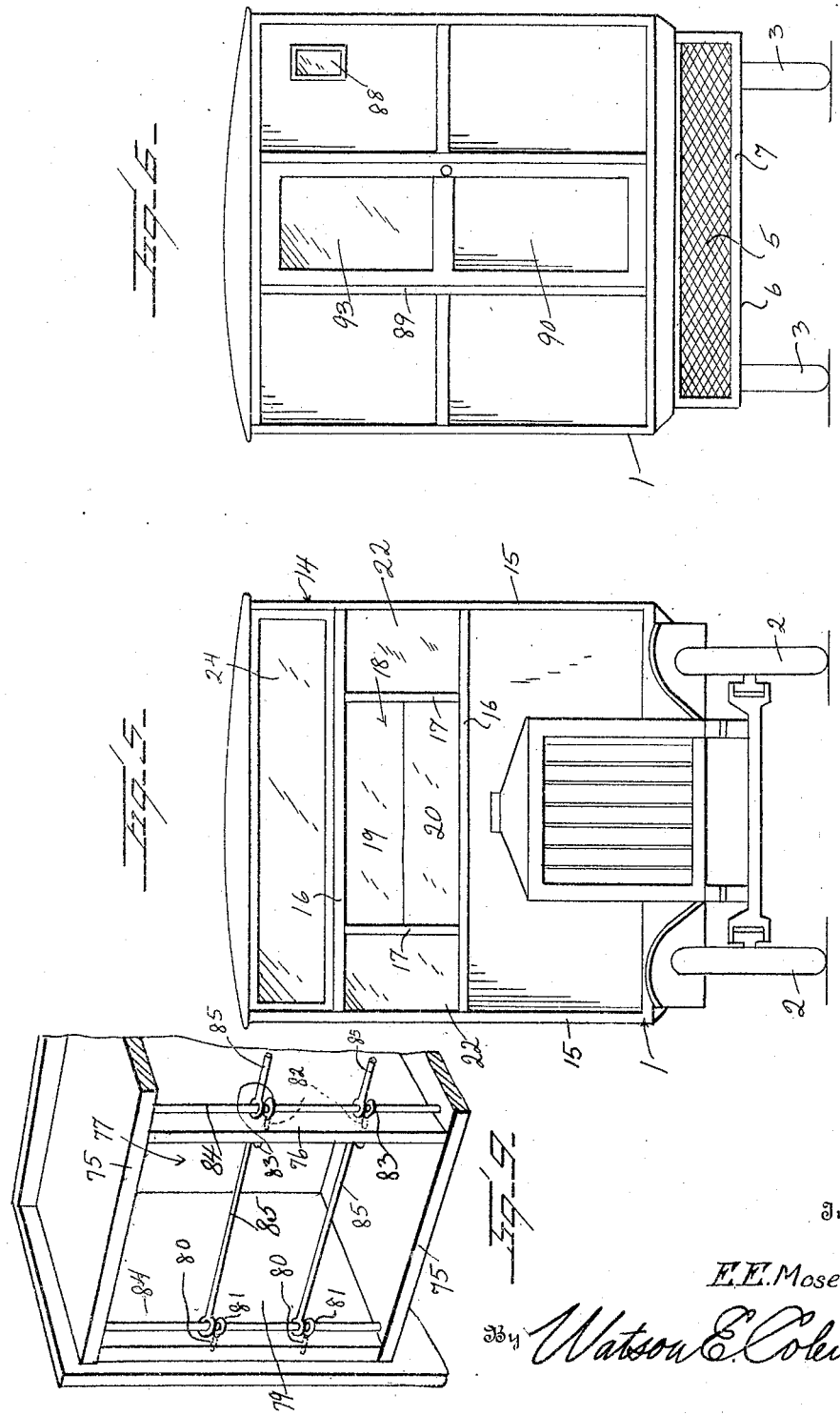

UNITED STATES PATENT OFFICE.

EVERETT E. MOSELEY, OF PINE BLUFF, ARKANSAS.

PORTABLE AUTOMOBILE GROCERY-STORE.

1,333,670. Specification of Letters Patent. Patented Mar. 16, 1920.

Application filed July 19, 1919. Serial No. 311,978.

*To all whom it may concern:*

Be it known that I, EVERETT E. MOSELEY, a citizen of the United States, residing at Pine Bluff, in the county of Jefferson and State of Arkansas, have invented certain new and useful Improvements in Portable Automobile Grocery-Stores, of which the following is a specification, reference being had to the accompanying drawings.

This invention relates to an automobile grocery store and one of the objects of the invention is to provide an apparatus of this kind including an automobile body large enough, whereby it may be fully equipped with every convenience, in the way of compartments, shelves, drawers, and the like, for holding and containing various articles sold in grocery stores.

A further general and most important object of the invention is the provision of an apparatus of this kind, whereby groceries of various kinds may be brought direct to the door of the housewife or housekeeper, where it is possible to make purchases of all necessary groceries, with considerable less inconvenience, and by all means cheaper than can be obtained from the ordinary grocery.

By this method considerable time and labor are avoided, and furthermore, the articles purchased will be fresher, particularly those in the vegetable, meat and poultry line of goods. It is apparent that this can be accomplished because of the proprietor of the automobile grocery store being able to secure supplies from the warehouse or direct from the commission merchants, or direct from the farmer who may bring vegetables direct to the city or town, thereby eliminating the middleman, and also due to the fact that the proprietor of the automobile grocery store will only take on a supply sufficient for one day's sale, hence delivering the goods direct from the wholesaler or farmer or commission merchant to the housewife. In this way, the proprietor of the automobile grocery store secures a supply of groceries particularly vegetable, meat and poultry line each day, and in regard to canned, box and like goods, it is possible to replenish the portable store, say for instance every two or three days.

A further object of the invention is the provision of complete system of ventilation, which includes raisable and lowerable sashes or glass panels.

A further object of the invention is the provision of a toilet compartment, which may be fitted out with a suitable chemical apparatus.

A further object of the invention is to provide an improved automobile grocery or like store, including an automobile body of the necessary type and construction and having a thorough and general arrangement of compartments, drawers, boxes, shelves and the like, in order to insure a complete classification of all goods, particularly those sold in cans, cartons, boxes, bags and the like, or those that may be sold in loose quantities.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of the improved automobile grocery store constructed in accordance with the invention.

Fig. 2 is a sectional plan view of the same, that is a view taken substantially a little below the top of the body of the automobile, thereby illustrating the arrangement of the interior of the body of this particular type of automobile, in fact, showing the driver's or chauffeur's compartment and the communication between it and the aisle through the rear portion of the body and showing the customers' vestibule and the arrangement of the various shelves, drawers and other like compartments for the reception of various goods on sale.

Fig. 3 is a longitudinal sectional view on line 3—3 of Fig. 2, looking in the direction of the arrow *a*, showing the arrangement of the shelves, drawers and the like on one side of the interior of the automobile grocery store body.

Fig. 4 is a sectional view also on line 3—3 of Fig. 2, but looking in the opposite direction, as indicated by the arrow *b*, thereby showing the arrangement of the toilet, certain shelves, show case, counter and compartments for bottled goods, upon the opposite side of the interior of the automobile grocery store body.

Fig. 5 is a front view of the automobile grocery store.

Fig. 6 is a rear view of the same.

Fig. 7 is a detail view of one of the adjustable glass sashes or panels, showing the arrangement, whereby it may be adjusted.

Fig. 8 is a detail view showing the lock for the coop, which is supported at the rear of the automobile.

Fig. 9 is an enlarged detail view in perspective of the compartment 77 showing how the rods 85 are supported.

Referring more especially to the drawings, 1 designates an automobile grocery store body, which may be any suitable shape or configuration on the exterior, preferably such as that illustrated, and 2 and 3 denote the forward and rear supporting wheels therefor.

It is to be understood that this improved automobile grocery store which is mounted upon wheels may be propelled, by means of the usual automobile engine (not shown), which may be provided with the usual self-starter and electric light system (not shown), so that the vehicle may be easily started and so that the interior may be suitably illuminated. Furthermore, the under part of the body, that is the frame or chassis thereof below both sides, is equipped with suitable tanks 4, containing coal oil and gasolene, not only sufficient gasolene to supply fuel to the engine of the apparatus, but also sufficient for selling purposes, to various customers.

At the rear of the body of the automobile grocery store, immediately below the chassis, a chicken coop 5 is suspended. It will be seen that the lower marginal corners of the coop are provided with a metal rim. In fact, the bottom of the coop is covered with sheet metal, as shown at 6, the marginal parts of which are provided with flanges 7, to surround and partially extend forwardly on the sides and ends of the coop, not only to reinforce the coop, but also affording means to render the coop substantially theft-proof. The coop is provided with a suitably hinged door 8 on one side, and the marginal flange of the sheet metal bottom has a staple, over which the hasp of the closure or door engages, thus when a padlock or similar means is engaged in the staple, the door may be securely locked, thereby preventing theft of the chickens or other live poultry that may be carried in the coop. When the lock is removed from the door, the bottom of the coop is prevented from falling or disconnecting from the frame of the coop. This is accomplished by means of hooks and eyes, which are designed to coöperatively engage and are placed on the inside of each end and bottom of the coop. In fact, the hooks 9 are carried by the inner surfaces of the ends of the coop and the eyes 10 are carried by the bottom, and they are so arranged as to prevent an unauthorized person from inserting an instrument or the fingers through the framework of the coop in order to operate the hooks. However, when connecting the hooks and eyes it may be accomplished by inserting the arm through the opening controlled by the door 8.

The body of the automobile grocery store is designed to be of a general rectangular contour, though not necessary, and the forward portion of the body is provided with a chauffeur's or driver's compartment 11 having a seat 12, on which the driver or chauffer may sit, in order to be in position to operate the steering wheel and engine operating means. To one side of the chauffeur's or driver's compartment a suitable storage box 13 is arranged, for the purpose of receiving various articles to be stored away, either articles pertaining to the apparatus itself or articles of food, preferably the latter.

As shown in Fig. 5 of the drawings, the body of the automobile grocery store is provided with a front frame 14, which consists of the uprights 15, the cross-connecting pieces 16, which are connected by the short vertical pieces 17. The usual form of wind shield 18 is arranged between the short vertical pieces 17, and it may be observed that this wind shield comprises the upper and lower sections 19 and 20, the adjacent edges of which as at 21 may be swung inwardly or outwardly. For instance, the upper edge of the section 20 of the wind shield may be moved inwardly or the lower edge of the upper section 19 may be swung upwardly and vice versa, in order to permit of ventilation in the usual manner, as is accomplished in using ordinary pleasure driving automobiles. Arranged adjacent the end edges of the wind shield are stationary glass sashes or panels 22 and hingedly suspended from the upper part of the top of the body of the grocery store as at 23 is an elongated sash or glass panel 24. This sash or panel may be swung inwardly and upwardly, and by means of suitable hooks or other fastenings 25, this glass panel or sash may be hooked to the inner surface of the top of the body, in order to permit of ventilation at a point above the wind shield.

The forward part of the body of the automobile grocery store on one side thereof has a side entrance 26, there being suitable steps 27, leading upwardly to the entrance. The lower step is flush with the surface of the side of the body, and also flush with the outer edge of the usual wheel guard. This entrance 26 has an opening of communication 28 with the chauffeur's or driver's compartment, there being a suitable door at 29 hinged at 30, to control the opening of communication between the entrance 26 and the driver's compartment.

It will be observed that the floor plan of the body of the automobile grocery store is suitably divided or partitioned off, to provide an aisle 31, leading from the chauffeur's or driver's compartment, practically through the center of the body to the rear thereof, there being an opening or passage of communication 32 between the driver's compartment and the aisle, which passage or opening of communication has a door 33, hinged at 34, so that the driver or chauffeur may readily have access from the driver's compartment to any part of the rear of the body, that is through the aisle.

Between certain of the steps of the front entrance on the side of the body of the vehicle a landing or platform 35 is provided, and leading from this landing or platform are several steps 36, which lead to the customers' vestibule 37, there being a door 38 hinged at 39 to control the opening of communication between the passage (where the steps 36 are formed) and the customers' vestibule. The door between the landing or platform and the driver's compartment may at all times be locked, thereby preventing the customer from entering the driver's compartment and thence into the salesroom through the passage 32. However, these doors 28 and 38 are provided with glass panels or sashes, so that the driver or chauffeur can very readily observe the customers as they enter, and the customer may very readily observe the interior of the vestibule before entering. These doors may be replaced by screen doors, if desired, in the hot or summer weather, so as to permit of a thorough ventilation. On one side of the passage, where the steps 36 are formed, a partition 40 is provided, the upper part of which is provided with a glass panel or sash 41, which is capable of being raised and lowered, for ventilation purposes, and also whereby the chauffeur or driver can readily observe the customer as he passes into the customers' vestibule. This glass panel or sash may be replaced in the summer time by a screen sash or panel.

To one side of the passage where the steps 36 are arranged, a suitable compartment or box 42 is provided, for the reception of tools and other articles pertaining to the automobile structure, so that parts of the engine, or the wheels or running gear may be easily repaired. This compartment or tool box is partitioned off from the passage where the steps 36 are formed by means of a partition 43.

The left wall of the driver's compartment or space is provided with the usual glass panels or sashes 44, which may be raised and lowered in the usual manner, and which may be replaced by screen panels or sashes, that is in the summer or hot weather.

Dividing the aisle or passage 31 from the customers' vestibule 37 is a partition 45, which in combination with the partition 46 forms the rectangular customers' vestibule, previously referred to. On one side of the partition 45 extending inwardly of the aisle or passage 31, on the corresponding side of the partition 46 are counters 47 and 48, on which the various articles as they are purchased may be placed, for the customer, and on which the customer may examine various articles as they are being purchased. The lower parts of these partitions 45 and 46 may be constructed of any suitable material, such as light wood or from thin sheet metal, such as used in constructing portions or parts of automobiles, while the upper portions of the partitions 45 and 46 consist of a plurality of glass panels or sashes 49, 50, 51 and 52. The panels 49 and 52 are stationary, and are provided for the purpose of permitting the customers to observe the bottled goods that may be arranged in the various compartments 53, and in the compartments 54 on the inner sides of the panels. The compartments 53 may be like pigeonholes or may be otherwise constructed, for the reception of various bottled goods, such as catsups, mustards and like articles. In fact, some of the compartments 53 may contain cakes, candies or the like. The compartments 54 on the inside of the glass panels or sashes 52 constitute the show cases, in which articles for sale may be on display. The clerk may have ready access to the compartments 54 in order to remove the various goods which are on display when chosen by the customers, by being enabled to insert an arm through the openings, as at 55. Rising upwardly from the counters 47 and 48 and immediately above the partitions 50 and 51 are glass panels or sashes 56 and 57, the former of which are arranged above and are stationary, while the latter glass panels or sashes 57 are capable of being raised or lowered, to permit customers to easily talk over the purchases to be made.

The left wall of the aisle or passage 31, near the forward part of the body of the automobile grocery store, that is immediately to the rear of the driver's seat is constructed with a plurality of compartments 58, super-imposed and having inclined bottoms. These compartments may be constructed by means of intersecting partitions of light wood or other suitable material, or metal, and are designed to receive fruit and vegetables for display. Adjacent the same wall of the body of the automobile store, just to the rear of the compartments 58 a suitable refrigerator 59 is constructed, for preserving various perishable articles of food, such as meats, butter, lard and the like. This refrigerator may have the usual ice compartment, and it may be observed that this compartment permits of access from the exterior of the body, so that ice may be deposited therein from the outside, thereby preventing the ice-man from carrying the ice through the entrance, and the aisle to the refrigerator. Suitable partitions 60 and 61 are arranged vertically on the left wall of the aisle or space 31, in order to divide off a space for the reception of the refrigerator. These partitions 60 and 61 extend the full height of the body of the automobile, there being a space 62 formed above the refrigerator, the top 63 of which constitutes a suitable support for weighing scales (not shown), so that various articles can be weighed, whereby the customer may receive the requisite weight.

Also, adjacent the left wall of the aisle or space 31, and above the compartments 58 is a plurality of vertical and horizontal partitions 64 and 65. One of the horizontal partitions 65 is arranged adjacent the top of the interior of the body, and extends across the top of the space 62. By means of these partitions 64 and 65 suitable compartments are constructed, for the reception of drawers 66. However, the compartments formed by the vertical partitions 67 between the top of the body of the automobile store and the uppermost partition 65 are much narrower than the other compartments, which receive the drawers 66. However, the latter compartments formed by the vertical partitions 67 also receive drawers 68. Between the uppermost compartments 58 and the lowermost partition 65 vertical partitions 69 are arranged in parallel spaced relation, thereby providing compartments 70 for smaller drawers 71. The fronts of these various drawers 66, 68 and 71 are suitably paneled with glass or other transparent material, so that the various articles contained in the drawers may be readily observed by the clerk, particularly by the customers, without in any way being able to handle the articles, hence preventing theft.

Also arranged upon the left side of the wall of the body immediately to the rear of the refrigerator is a plurality of vertical and horizontal partitions 72 and 73, which intersect one another, hence constructing a plurality of rectangular compartments or open shelves 74, for the reception of various articles for sale, such as melons, cantaloups, or other produce.

Arranged above the compartments 74 is a plurality of horizontal shelves 75, there being a plurality of vertical partitions 76 super-imposed, hence dividing the shelves 75 into elongated compartments 77. A partition 78 is arranged between the scale space 62 and the compartments 77. Secured to the end walls 79 of certain of the compartments 77 and the end wall 78 are screws 80, having eyes 81. The partitions 76 have screws 82 provided with eyes 83, and arranged in the eyes 81 and 83 and interposed end-wise between the shelves 75 are vertical rods 84. The horizontal shelves 75 extend inwardly toward the aisle a little beyond the edges of the partitions 76 and 78. The screws 80 and 82 are arranged relatively to the edges of the partitions 76 and 78, so as to position the vertical rods 84 a little beyond the edges of said partitions, whereby a plurality of horizontal rods 85 may be positioned between vertical rods and the edges of the partitions, hence resting upon the screws. Certain of these screws are arranged between the shelves at spaced intervals as illustrated, and the shelves are designed to support various articles, such as canned goods, larger bottled goods than heretofore mentioned, cereals and various other like articles. When such articles are purchased, the clerk may readily raise any one of the horizontal rods, which are guided between the vertical rods and the edges of the partitions, to permit the desired article to be easily removed. After the article is removed, the rod may fall by gravity to its initial position, hence retaining the remaining articles in place.

On the right hand side of the aisle or passage 31 at the rear is a toilet compartment, having a paneled door 86, hinged at 87. One of the walls of the toilet near the upper part is provided with a small glass paneled window 88, for the purpose of ventilating the toilet. The rear wall of the body of the automobile grocery store between the toilet and the shelves 73 and 75 is provided with an exit opening 89 having a closure or door 90 hinged at 91 and this rear door 90 is provided with a drop glass sash or panel 93 for light and ventilation, which glass panel or sash may be raised and lowered in any conventional manner, as may be found convenient.

Adjacent the toilet near the lower portion of the right hand side of the aisle or space 31 a plurality of horizontal and vertical partitions 93 and 84 are provided intersecting one another, thereby forming compartments for different articles, such as flour and meal sacks, also milk, lard and like articles and also some of the compartments may contain potatoes and like vegetables.

Adjacent the compartments formed by the partitions 93 and 94 other suitable spaces 95 are formed, one of which may contain drawers 96, while the other may contain a suitable parer or cutter (not shown). Above the compartments formed by the partitions 93 and 94 additional vertical partitions 97 are provided, which are intersected by the horizontal shelves 98, thereby forming the compartments 99. The edges of the vertical partitions 97 support horizontal rods, similar to the rods 85, by means of the screw eyes, which are similar to the screw eyes 82, and therefore are designated by like numerals. These horizontal rods which are similar to the rods 85 are capable of being raised to permit various articles that may be supported upon the shelves 98 to be removed. Certain of the compartments 99 are closed by means of fabric or meshwork closure 100, as shown in Fig. 4.

Below the counter a plurality of horizontal shelves 101 are provided, for the reception of various articles to be sold. One of the compartments formed by one of the shelves 101 is subdivided by the partition 102, and in the compartments upon either side of the partition 102 suitable drawers 103 are arranged, for the support of various articles to be sold.

Below the shelves of the compartments 53 additional shelves 104 are formed for the reception of other bottled goods.

To the rear of the driver's seat a suitable glass panel 105 is provided, including a sash 106, which may be mounted in order to be raised and lowered in any suitable manner.

The outer wall of the customers' vestibule is provided with double windows or sashes 107, which are mounted in order to be raised and lowered in any conventional manner, in order to ventilate the customers' vestibule.

The frame of the body may be constructed of any suitable hard thin wood, of sufficient size and strength to carry the necessary weight or load. If desired, the walls of the body may be made of thin strong wood or sheet steel and paneled, as previously stated.

The drawers immediately below the counter are designed primarily for the reception of cash, thread and similar articles. In fact, a conventional form of cash drawer may be arranged under the counter in any suitable manner.

Certain of the compartments or spaces 95 also are constituted for receiving wrapping paper and bags, and other similar articles, for wrapping and for containing the various purchases to be made.

The bottom of the body of the automobile grocery store near the rear thereof is provided with a hinged trap door 110.

In Fig. 9, the vertical rods 84 are disposed between the horizontal shelves, and furthermore the vertical partitions 76 are the same width as the horizontal shelves, and in this case the vertical rods 84 are arranged adjacent the side faces of the vertical partitions, near their outer edges. Also, in this figure, the rods 85 have eyes engaging the rods 84, so that the rods 85 may be moved upwardly and downwardly. It will be observed that in Fig. 3, the vertical rods 84 are arranged adjacent the edges of the vertical partitions, instead of adjacent their side faces, and in this case, the horizontal rods 85, as previously stated operate upwardly and downwardly between the vertical rods 84 and the forward edges of the vertical partitions.

From the foregoing it will be noted that this automobile grocery store apparatus, from the proprietor's view point, has its advantages. For instance, an ordinary grocery store has numerous over-head expenses, such as clerk hire, fixtures, delivery wagons (which require drivers or chauffeurs) light, heat and many other expenses. With the present form of automobile grocery store, these various expenses are considerably reduced, for when purchasing the automobile fully equipped, the various necessary fixtures will be part of the body of the automobile, thereby not only combining the delivery wagon and store or housing, but also combining the fixtures in one expense. When operating this style of store, a combined chauffeur and clerk may be hired, as it has been found that a proprietor and a single clerk may supply the needs of the customers.

Furthermore, it will be noted that the driver's or chauffeur's compartment is partitioned off from the entrance to the customer's vestibule or compartment, so that should the proprietor act as the chauffeur, it is possible that the customers may be easily seen when entering the customer's vestibule, as the partition between the chauffeur's compartment and the entrance to the customer's vestibule has a glass or other transparent panel. Also the entrance between the chauffeur's compartment and the central aisle of the store is provided with a door or closure, which has its upper parts provided with a glass or other transparent panel, so that the chauffeur can observe customers in the vestibule, provided they entered the vestibule when the chauffeur was looking in an opposite direction.

Also the invention provides that the customers in the vestibule can easily observe the goods on display in the sales room owing to the partition between the aisle and the customer's vestibule being provided with glass or other transparent panels. Obviously the customers may easily observe the goods being purchased without in any way handling the goods, thereby avoiding theft.

The invention having been set forth, what is claimed as new and useful is:

1. In an automobile grocery store, the combination with a vehicle body provided with a chauffeur's compartment, a side entrance forward of the body communicatively connected with the driver's compartment, a customers' vestibule to the rear of the entrance communicatively connected with the entrance, said body having a central aisle from the driver's compartment to the rear, and closures between the customers' vestibule and the entrance and between the driver's compartment and the entrance and between the aisle and the driver's compartment.

2. In an automobile grocery store, the combination with a vehicle body provided with a chauffeur's compartment, a side entrance forward of the body communicatively connected with the driver's compartment, a customers' vestibule to the rear of the entrance communicatively connected with the entrance, said body having a central aisle from the driver's compartment to the rear, and closures between the customers' vestibule and the entrance and between the driver's compartment and the entrance and between the aisle and the driver's compartment, said aisle upon opposite sides from the forward part of the body to the rear being provided with a plurality of shelves, compartments and drawers, for the reception of various articles on display for sale.

3. An automobile grocery store, comprising a body having a central aisle, thereby dividing the body, the opposing walls on the opposite sides of the body being provided with a plurality of compartments or shelves, for the reception of various articles on display, one side of the body having a customers' vestibule communicatively connected with the aisle, the forward part of the body on one side having a chauffeur's compartment having a passage of communication with the aisle, a door controlling said passage of communication, the forward part of the body on the other side opposite the chauffeur's compartment having an entrance having communicative connections respectively with the chauffeur's compartment and the customers' vestibule.

4. A portable grocery store, comprising a portable housing provided with a central aisle having an entrance at the forward end of the housing, means upon opposite walls of the aisle to support articles for sale, a customers' vestibule to the rear of the entrance, a partition between the vestibule and the aisle, said partition having a counter, and a communicative connection between the vestibule and the aisle over the counter.

In testimony whereof I hereunto affix my signature in the presence of two witnesses.

EVERETT E. MOSELEY.

Witnesses:
W. O. LEWIS,
W. E. SCHMUL.